United States Patent [19]

Crabbs

[11] 4,083,315
[45] Apr. 11, 1978

[54] SOIL WORKING AND SEED PLANTING APPARATUS

[76] Inventor: Max L. Crabbs, R.R. No. 5, Box 290, Hutchinson, Kans. 67501

[21] Appl. No.: 755,676

[22] Filed: Dec. 30, 1976

[51] Int. Cl.² .................................. A01B 33/02
[52] U.S. Cl. ........................................... 111/10
[58] Field of Search ............................ 111/8–13; 172/68, 112, 59

[56] References Cited

U.S. PATENT DOCUMENTS

| | | | |
|---|---|---|---|
| 1,500,437 | 7/1924 | Burton | 111/10 |
| 3,528,508 | 9/1970 | Stevenson | 111/10 X |
| 3,563,191 | 2/1971 | Yovanovich | 111/10 |
| 3,661,213 | 5/1972 | Taylor | 172/72 |
| 3,899,029 | 8/1975 | van der Lely et al. | 111/10 X |
| 4,006,781 | 2/1977 | van der Lely et al. | 172/68 X |

*Primary Examiner*—Edgar S. Burr
*Assistant Examiner*—James R. Feyrer
*Attorney, Agent, or Firm*—Fishburn, Gold & Litman

[57] ABSTRACT

A soil working and seed planting apparatus includes a frame connected to a prime mover and supporting thereon a seed dispensing device operative to dispense seed in response to rotation of a soil working device which is operative to form a plurality of longitudinally and laterally spaced pockets in the soil surface and soil mounds on the soil surface. The soil working and seed planting apparatus includes an elongated roller mounted on the frame and operative to level the soil mounds and to move the soil over the seed in response to forward movement of the frame.

2 Claims, 4 Drawing Figures

SOIL WORKING AND SEED PLANTING APPARATUS

The present invention relates to soil working and seed planting apparatus and more particularly to such an apparatus adapted for lawn and field seeding of grass or grain seeds to form lawns, pastures, or grain fields.

The principal objects of the present invention are: to provide a soil working and seed planting apparatus particularly adapted for lawn and field seeding of grass or grain seeds to form lawns, pastures, or grain fields; to provide such an apparatus having a soil working device operative to form a plurality of longitudinally and laterally spaced pockets in the soil surface and to form soil mounds on the soil surface; to provide such an apparatus having a soil working device which is self-cleaning upon rearward movement of the apparatus or upon removal, reversing, and remounting of the soil working device and then moving the apparatus forward; to provide such an apparatus having a novel roller mounted in trailing relation with the soil working device and operative to level soil mounds formed by the soil working device and to move soil over seed in response to forward movement of the apparatus; to provide such a soil working and seed planting apparatus wherein the seed dispensing device only operates when the soil working device rotates so that the apparatus is inoperative when moved to a storage position by the prime mover; to provide such an apparatus wherein the roller has a periphery defined by plurality of elongated longitudinally extending and circumferentially spaced rods effective to break up clods and to level soil and move same over seed; to provide such an apparatus wherein the rods on the roller are arranged in a spiral pattern for the length of the roller whereby the roller is substantially smooth in movement over the soil surface and is not subject to bounce or skip and thereby provides a better covering of seed; and to provide such a soil working and seed planting apparatus which is economical to manufacture, durable in construction, positive in operation, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of the specification and include an exemplary embodiment of the present invention and illustrate various objects and features of the soil working and seed planting apparatus.

Figure 1:
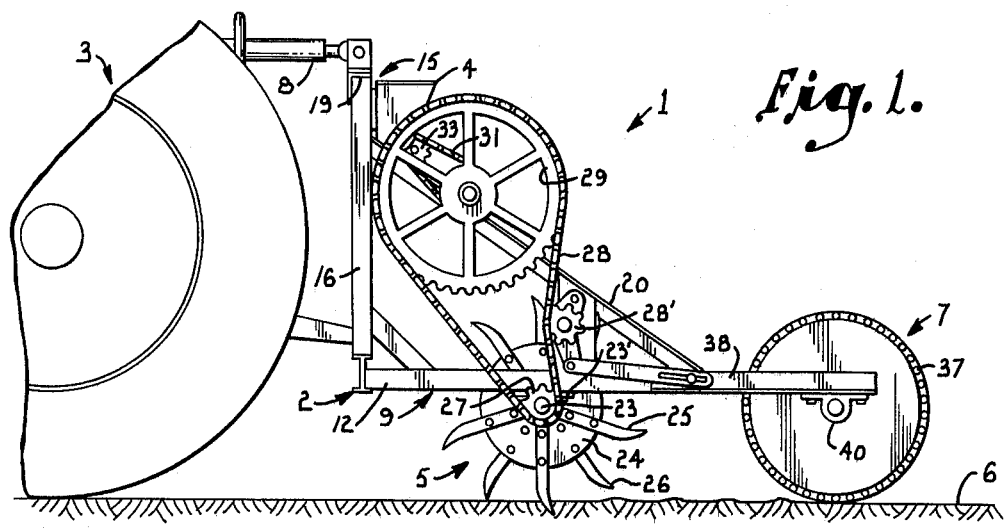
FIG. 1 is a side elevational view of a soil working and seed planting apparatus embodying features of the present invention.
Figure 2:
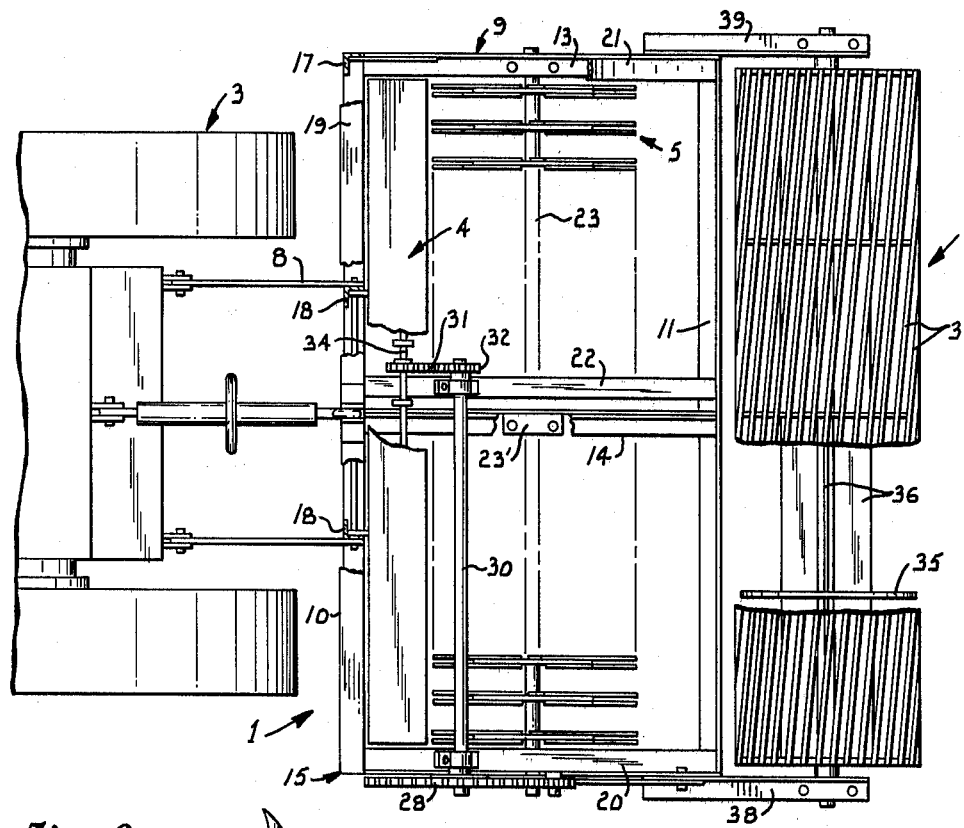
FIG. 2 is a top plan view of the soil working and seed planting apparatus with portions broken away to better illustrate the component parts.
Figure 3:
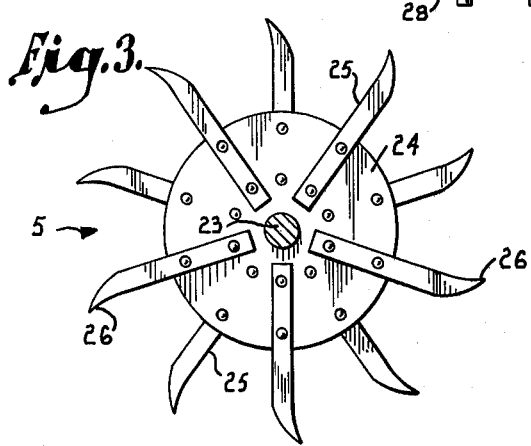
FIG. 3 is an enlarged side elevational view of one disc of a soil working device.
Figure 4:
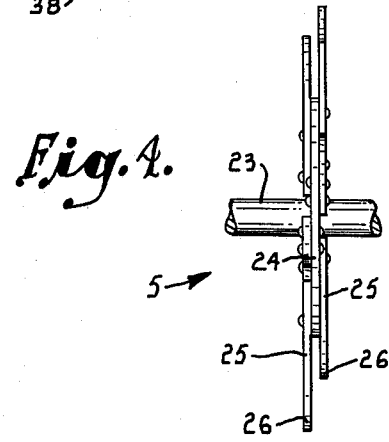
FIG. 4 is an enlarged edge elevational view of the one disc of the soil working device.

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring more in detail to the drawings:

In the disclosed embodiment of the present invention, the reference numeral 1 designates generally a soil working and seed planting apparatus particularly adapted for lawn and field seeding of grass and grain seeds to form lawns, pastures, or grain fields. The soil working and seed planting apparatus 1 includes a frame 2 connected to a prime mover 3 and supporting thereon a seed dispensing device 4, a soil working device or digger 5 and an elongated roller 7. The apparatus 1 is operative to work the soil, for spaced pockets and mounds thereon, dispense seed thereon and substantially level the soil mounds and to move the soil over the seed in response to forward movement of the frame 2.

The frame 2 is connected to the prime mover 3 by a suitable three-point hitch 8 so that an operator of the prime mover 3 may selectively move the apparatus 1 between a raised or storage position and a lowered or in-use position. The illustrated frame 2 includes a base portion 9 which is generally rectangular in shape and has the long dimension thereof transverse of the direction of travel of the frame 2. The frame base portion 9 is defined by leading and trailing side members 10 and 11 respectively and by opposite end members 12 and 13. The frame base portion 9 includes one or more intermediate brace members 14 extending between the leading and trailing side members 10 and 11 and substantially parallel with the opposite end members 12 and 13.

The frame 2 includes an upstanding portion 15 having the seed dispensing device 4 mounted thereon and the frame upstanding portion 15 also has the three-point hitch 8 connected thereto. In the illustrated embodiment, end posts 16 and 17 extend upwardly from the leading side member 10 of the frame base portion 9 and are longitudinally aligned with the opposite end members 12 and 13 respectively. A plurality of intermediate members 18 also extend upwardly from the leading side member 10. A top or upper member 19 is positioned above the leading side member 10 and the top or upper member 19 is suitably connected, as by welding, to the end posts 16 and 17 and to the intermediate member or members 18, thereby completing the frame upstanding portion 15.

The frame 2 is a substantially rigid structure and, therefore, includes end brace members 20 and 21 extending upwardly and forwardly from the opposite end members 12 and 13 respectively. The end brace members 20 and 21 have upper ends thereof connected to the end posts 16 and 17 respectively. Intermediate brace members 22 extend between the trailing side member 11 and a respective one of the intermediate members 18 of the upstanding portion 15 thereby providing a substantially rigid frame 2.

The soil working device 5 includes an elongated shaft 23 extending transversely of the direction of travel of the frame 2 and having opposite end portions thereof rotatably mounted on the opposite end members 12 and 13 respectively. The elongated shaft 23 is positioned substantially parallel with and intermediate the leading and trailing side member 10 and 11. The elongated shaft 23 is also rotatably supported on the intermediate member or members 14 extending between the leading and trailing side members 10 and 11. Suitable bearing members 23' are preferably secured to the end members 12 and 13 and intermediate member 14 to provide the rotatable mounting of the shaft 23.

The soil working device 5 is rotated by forward movement of the frame 2 when in the in-use position and is operative to form a plurality of longitudinally and laterally spaced pockets in the soil surface 6 and to form soil mounds upon the soil surface 6. The soil working device 5 includes a plurality of generally circular discs 24 mounted along the length of the elongated shaft 23 in suitable spaced apart relation.

The circular discs 24 each have a plurality of circumferentially spaced tines 25 mounted thereon and extending substantially radially outwardly from the respective disc 24. In the illustrated embodiment, the tines 25 are mounted on each face of the discs 24 and alternate from one side or face of the disc 24 to the other side or face thereof. The tines 25 each have a forwardly curved or arcuate end portion 26 adapted for digging in the soil surface 6. It is preferred that the tine ends have a circumferential spacing of 4 to 5 inches and that the spacing of the digger discs be 4 to 5 inches with the tines on one disc staggered relative to the tines of an adjacent disc.

The soil working device 5 is self-cleaning if the prime mover 3 moves the frame 2 rearwardly so that the body of each tine 25 enters the soil before the forwardly curved end portion 26 thereof.

The elongated shaft 23 on bearings 23' therefor are mounted so that the shaft 23 with the discs 24 thereon may be removed and turned end for end and remounted on the end members 12 and 13 and intermediate member 14 of the frame base portion 9 so that the arcuate end portions 26 are rearwardly curved. When so mounted the soil working device is self-cleaning when the apparatus 1 is moved forwardly by the prime mover 3 so that the engagement of soil with debris on the arcuate end portion 26 of the tines 25 causes the debris to move off of the respective tine 25.

Forward movement of the frame 2 over the soil surface effects rotation of the soil working device 5. The forwardly curved end portions 26 of the tines 25 are positioned so that a tip or point thereof engages the soil surface first and leads the respective tine 25 through the soil as the elongated shaft 23 rotates. The tip or point of the tine forwardly curved end portions 26 also leaves the soil first so that each tine 25 forms a groove or pocket in the soil surface. As the shaft 23 rotates, the soil removed by the tines 25 is raised or lifted and directed rearwardly onto the soil surface by the tines 25 thereby forming soil mounds.

The seed dispensing device 4 is suitably supported on the upstanding portion 15 of the frame 2 and is operatively connected to the soil working device 5 so that the dispensing device 4 operates only when the soil working device is rotated by engagement with the soil and movement therealong. In the illustrated embodiment, a sprocket 27 is mounted on one end portion of the elongated shaft 23. An endless chain 28 extends around the sprocket 27 on the elongated shaft 23 and around a sprocket 29 on one end portion of an operating shaft 30. Suitable tension is maintained in the endless chain 28 by a chain tightening sprocket 28' adjustably mounted on the frame end member adjacent the sprocket 27 on the one end of the elongated shaft 23.

The operating shaft 30 is suitably rotatably mounted on the frame 2, as by being mounted or supported on one inclined end brace member, for example, end brace 20, and on one or more of the inclined intermediate brace members 22. The other or opposite end portion of the operating shaft 30 is connected to the seed dispensing device 4 by an endless chain 31 extending around a sprocket 32 on the other end portion of the operating shaft 30 and around a sprocket 33 on a drive shaft 34 of the seed dispensing device 4.

The roller 7 is rotatably mounted on the base portion 9 of the frame 2 and is positioned rearwardly of and substantially parallel with the trailing side member 11 thereof. The roller 7 is operative to level soil mounds formed by the soil working device 5 and to move soil over seed dispensed from the seed dispensing device 4 in response to forward movement of the frame 2.

The roller 7 includes a body portion defined by a plurality of longitudinally spaced generally circular discs 35 each having a peripheral edge. The roller body portion includes suitable means extending between the discs 35 for maintaining the spacing between the disc 35 and supporting same in longitudinal alignment. In the illustrated embodiment, a plurality of circumferentially spaced bars 36 extend between and have opposite ends thereof suitably connected to the respective discs, as by welding.

The roller 7 has a periphery thereof defined by a plurality of longitudinally extending and circumferentially spaced rods 37 mounted on the peripheral edge of the spaced discs 35 and extending therebetween. The rods 37 defining the periphery of the roller 7 are each arranged in a spiral path for the length of the roller 7. The spiral arrangement of the rods 37 defining the periphery of the roller 7 permits smooth rolling of the roller and avoids bounce or skip of the roller 7.

The illustrated mounting of the roller 7 on the base portion 9 of the frame 2 includes end member extensions 38 and 39 mounted on and extending rearwardly from the base portion end members 12 and 13 respectively. The end discs 35 have suitable axles extending outwardly therefrom and rotatably supported in bearing members 40 on the end member extensions 38 and 39 respectively.

In the illustrated structure, the roller has rods about $\frac{3}{8}$ to $\frac{1}{2}$ inch in diameter with a spacing of 1 to 3 times the rod diameter. The spiral of the rods in such that at one end of the roller a rod is about 20° to 60° in advance of said rod at the other end of the roller. This provides the smooth rolling and efficient seed covering.

In using a soil working and seed planting apparatus, constructed as illustrated and described, the three-point hitch 8 is suitably connected to the upstanding portion 15 of the frame 2. The prime mover 3 is moved to the area to be seeded and the frame 2 is lowered to the in-use position. The prime mover 3 and the frame 2 are moved over the soil surface 6. The forward movement of the frame 2 effects rotation of the soil working device 5 and the forming of a plurality of longitudinally and laterally spaced pockets in the soil surface 6 and the forming of the plurality of soil mounds on the soil surface 6. Normally the depth of digging is about $\frac{1}{2}$ inch, however, it may be as great as 2 inches. Rotation of the soil working device 5 effects operation of the seed dispensing device 4 and dispensing of seed onto the soil surface 6 immediately in front of the soil working device 5 and, therefore, before working of the soil by the tines 25. Movement of the roller 7 over the seeded and worked soil surface is effective to level the soil mounds and to move the soil over seed on the surface. When it is desired to discontinue seeding, the frame 2 is raised to the storage position. In the event that it is necessary to clean the tines 25 of the soil working device 5, the prime mover 3 may be driven in reverse to thereby turn the elongated shaft 23 and the discs 24 thereon in a reverse direction whereby the forwardly curved end portion 26 of the tines 25 move in the opposite direction through the soil and are thereby cleaned.

The depth of soil working working is controlled by the hitch to the prime mover that provides the selected lift or relative height of the planting apparatus 1. Therefore, the soil working and seed planting apparatus 1 may be used to reseed an area or field which has sparse growth without formation of the soil pockets and mounds yet work the soil surface 6 sufficiently to permit same to catch and retain the seeds, all with minimum damage to growing vegetation, such as grass or the like. The elongated shaft 23 with the discs 24 thereon is removed, turned end for end, and remounted on the frame base portion 9. Forward movement of the prime mover 3 does not effect dispensing of seed as the sprocket 27 is then on the opposite side of the frame from the chains to the drive of the seed dispensing device.

It is to be understood that while I have illustrated and described one form of my invention, it is not to be limited to the specific form or arrangement of parts herein described and shown.

What I claim and desire to secure by Letters Patent is:

1. A soil working and seed planting apparatus comprising:
   (a) a frame connectible to a prime mover and having a leading edge portion and a trailing edge portion;
   (b) soil working means rotatably mounted on said frame intermediate said leading edge portion and said trailing edge portion and comprising an elongated shaft extending transversely of the direction of travel of said frame, a plurality of longitudinally spaced discs mounted on said shaft, and a plurality of circumferentially spaced tines on each of said discs, each of said tines extending radially outwardly from a respective one of said discs and respectively having a body with a forwardly curved end portion angled toward said trailing edge portion when said tines are positioned in earth contact for contemporaneously forming a plurality of longitudinally and laterally spaced pockets in the soil surface and soil mounds on the soil surface, said earth working means being driven solely by contact of said tines with the earth as the apparatus is translated over the earth, said body being shaped for entering the soil before the forwardly curved end portion when said apparatus is translated rearwardly for self-cleaning said tines;
   (c) seed dispensing means mounted on the frame leading edge portion and driven by said soil working means and operative for dispensing seed in response to rotation of said soil working means; and
   (d) roller means rotatably mounted on the frame trailing edge portion for leveling the soil mounds and moving soil over the seed in response to forward movement of said frame, said roller means having a periphery defined by a plurality of longitudinally extending and circumferentially spaced rods; said roller means including a plurality of longitudinally spaced generally circular discs each having a peripheral edge, said rods being spirally mounted on the said peripheral edge and extending radially outwardly thereof for smoothly leveling said soil mound and preventing contact of said discs with the soil surface.

2. A soil working and seed planting apparatus as set forth in claim 1 wherein said roller means rods are each arranged in a spiral path for the length of said roller means with said rods being $\frac{3}{8}$ inch to $\frac{1}{2}$ inch in diameter and with one end of each rod being between 20° to 60° in advance of the other end thereof.

* * * * *